US009802669B2

(12) United States Patent
Jordan et al.

(10) Patent No.: US 9,802,669 B2
(45) Date of Patent: Oct. 31, 2017

(54) ELECTRONIC SHIFTING SYSTEMS AND METHODS

(71) Applicant: SRAM, LLC, Chicago, IL (US)

(72) Inventors: Brian Jordan, Chicago, IL (US); Todd Squires, Bull Valley, IL (US); Mason Pluimer, Chicago, IL (US); Sage Hahn, Chicago, IL (US); Alexander Kon-I Ho, Arlington Heights, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 15/226,541

(22) Filed: Aug. 2, 2016

(65) Prior Publication Data
US 2016/0339986 A1 Nov. 24, 2016

Related U.S. Application Data

(60) Continuation-in-part of application No. 14/534,363, filed on Nov. 6, 2014, now Pat. No. 9,540,071, which
(Continued)

(51) Int. Cl.
| | |
|---|---|
| *B62K 23/02* | (2006.01) |
| *B62M 25/08* | (2006.01) |
| *B62M 9/132* | (2010.01) |
| *B62M 9/122* | (2010.01) |
| *H04B 1/08* | (2006.01) |
| *H04B 1/10* | (2006.01) |
| *G08C 17/02* | (2006.01) |

(Continued)

(52) U.S. Cl.
CPC ............. *B62K 23/02* (2013.01); *B62M 9/122* (2013.01); *B62M 9/132* (2013.01); *B62M 25/08* (2013.01); *G08C 17/02* (2013.01);

*H04B 1/082* (2013.01); *H04B 1/1036* (2013.01); *B62J 2099/002* (2013.01); *H04W 74/08* (2013.01); *Y10T 74/2003* (2015.01)

(58) Field of Classification Search
CPC ....... B62K 23/02; B62M 25/08; B62M 9/132; B62M 9/122; H04B 1/082; H04B 1/1036; H04W 74/08; Y10T 74/2003; B62J 2099/002; G08C 17/02
See application file for complete search history.

(56) References Cited

U.S. PATENT DOCUMENTS

| | | |
|---|---|---|
| 5,870,381 A | 2/1999 | Kawasaki |
| 6,023,646 A | 2/2000 | Kubacsi et al. |
| (Continued) | | |

FOREIGN PATENT DOCUMENTS

| | | |
|---|---|---|
| EP | 0841243 | 5/1998 |
| EP | 1759971 | 3/2007 |
| (Continued) | | |

*Primary Examiner* — Richard Camby

(57) ABSTRACT

A wireless control system for a bicycle, comprising a first shift control unit for a component of a bicycle, the first control unit comprising a radio configured to receive control signals, wirelessly transmitted by a second control unit of the bicycle; the radio operable to receive the control signals only when the radio is operating in a listen mode; and a processor configured to: activate the listen mode of the radio for a first length of time; detect, with the radio, a noise level during the first length of time; and extend the activation of the listen mode for a first extended time period when the noise level achieves a noise level threshold.

21 Claims, 11 Drawing Sheets

Related U.S. Application Data is a division of application No. 13/712,616, filed on Dec. 12, 2012, now Pat. No. 8,909,424.

(60) Provisional application No. 61/712,636, filed on Oct. 11, 2012.

(51) Int. Cl.
*H04W 74/08* (2009.01)
*B62J 99/00* (2009.01)

(56) References Cited

U.S. PATENT DOCUMENTS

| | | | |
|---|---|---|---|
| 6,204,775 | B1 | 3/2001 | Kubacsi |
| 6,623,389 | B1 | 9/2003 | Campagnolo |
| 7,274,907 | B1 | 9/2007 | Perotti |
| 7,623,931 | B2 | 11/2009 | Campagnolo |
| 7,704,173 | B2 | 4/2010 | Ichida |
| 7,761,212 | B2 | 7/2010 | Takebayashi |
| 8,271,058 | B2 | 9/2012 | Rhee |
| 8,655,561 | B2 | 2/2014 | Kitamura |
| 8,721,495 | B2 | 5/2014 | Kitamura |
| 8,874,338 | B2 | 10/2014 | Miglioranza |
| 8,918,665 | B2 | 12/2014 | Low |
| 2004/0063528 | A1 | 4/2004 | Campagnolo |
| 2004/0235597 | A1 | 11/2004 | Guderzo |
| 2005/0143145 | A1 | 6/2005 | Maekawa |
| 2005/0255831 | A1 | 11/2005 | Kato |
| 2009/0102628 | A1 | 4/2009 | Takebayashi |
| 2009/0240858 | A1 | 9/2009 | Takebayashi |
| 2009/0315692 | A1 | 12/2009 | Miki et al. |
| 2010/0112950 | A1 | 5/2010 | Haartsen |
| 2010/0214222 | A1 | 8/2010 | Yen |
| 2011/0045875 | A1 | 2/2011 | Rhee |
| 2011/0320093 | A1 | 12/2011 | Kitamura |
| 2012/0035011 | A1 | 2/2012 | Menachem |

FOREIGN PATENT DOCUMENTS

| | | |
|---|---|---|
| EP | 1475302 | 7/2007 |
| EP | 2399813 | 12/2011 |

ELECTRONIC SHIFTING SYSTEMS AND METHODS

The present application is a continuation in part of U.S. application Ser. No. 14/534,363, filed Nov. 6, 2014, which is a divisional of prior U.S. application Ser. No. 13/712,616, filed Dec. 12, 2012, now U.S. Pat. No. 8,909,424, which claims the benefit of Provisional Application No. 61/712,636, filed Oct. 11, 2012, the contents of which are incorporated by referenced herein in their entirety.

BACKGROUND OF THE INVENTION

The invention relates to bicycle gear changing systems. In particular, the invention is directed to systems including wirelessly actuated bicycle gear changers. The systems include bicycle gear changers controlled by a wireless control signal, wherein the wireless control signal is generated by a bicycle control component.

One prior art electromechanical shifting system required a wireless transmitter and receiver to be on continuously. To conserve energy, a very low-power & low-range transceiver was utilized. However, the low-power transceiver suffered from poor wireless performance. A more recent system requires a periodic beacon signal which will also always consume battery power.

There is a need for a highly reliable and more secure wireless control system for bicycles. The invention satisfies the need.

SUMMARY OF THE INVENTION

The invention uses a relatively higher-power transmitter and receiver, with power conserved by turning the transmitter and receiver off when not in use and by power cycling the transmitter and receiver between a radio listen mode and a radio off mode when the bicycle is active. Once a predetermined noise threshold is achieved, defining a noisy environment, the inventive system provides an extended radio listen mode to avoid lost transmissions.

One aspect of the invention provides a wireless control system for a bicycle, comprising a first shift control unit for a component of a bicycle, the first control unit comprising a radio configured to receive control signals, wirelessly transmitted by a second control unit of the bicycle. This aspect further provides that the radio is operable to receive the control signals only when the radio is operating in a listen mode, and a processor configured to: activate the listen mode of the radio for a first length of time; detect, with the radio, a noise level during the first length of time; and extend the activation of the listen mode for a first extended time period when the noise level achieves a noise level threshold.

Another aspect of the invention provides a method for transmitting and receiving wireless control signals on a bicycle, wherein the method comprises: transmitting wireless control signals to a radio; listening, periodically, with the radio for a first length of time, for control signals transmitted by a control unit of a bicycle on a communication frequency channel; determining, with a processor, a noise level on the frequency channel during the first length of time; and listening with the radio for control signals for an extended length of time when the noise level achieves a noise level threshold.

Yet another aspect of the invention provides a bicycle control system, configured to accommodate a first shift control unit, the first shift control unit comprising: a radio configured to receive a control signal wirelessly transmitted by a second control unit of the bicycle, the radio operable to receive the control signal only when the radio is operating in a listen mode. The first shift control unit further comprising a processor configured to: periodically activate the listen mode of the radio for a plurality of listen time periods; periodically detect, with the radio, a noise level during the listen time periods; deactivate the listen mode of the radio when the noise level has not achieved a noise level threshold during the listen time periods; extend the activation of the listen mode for an extended time period when the radio detects that the noise level has achieved the noise level threshold during any listen time period of the plurality of listen time periods; and deactivate the listen mode of the radio when the noise level has not achieved the noise level threshold during the extended time period.

Yet another aspect of the invention provides a wireless control system for a bicycle. The wireless control system includes a first control unit for a component of a bicycle, the first control unit. The first control unit includes at least one noise radio configured to detect a noise level of a wireless environment comprising signals wirelessly transmitted by a second control unit of the bicycle, and at least one receiving radio configured to receive control signals, wirelessly transmitted by the second control unit of the bicycle, the at least one radio operable to receive the control signal only when the radio is operating in a listen mode, and a processor. The processor is configured to activate the listen mode of the at least one receiving radio for a first length of time, detect, with the at least one noise radio, the noise level, and extend the activation of the listen mode for a first extended time period when the noise level achieves a noise level threshold.

DETAILED DESCRIPTION OF THE INVENTION

Embodiments of the invention will herein be described with reference to the drawings. It will be understood that the drawings and descriptions set out herein are provided for illustration only and do not limit the invention as defined by the claims appended hereto and any and all their equivalents. For example, the terms "first" and "second," "front" and "rear," or "left" and "right" are used for the sake of clarity and not as terms of limitation. Moreover, the terms refer to bicycle mechanisms conventionally mounted to a bicycle and with the bicycle oriented and used in a standard fashion unless otherwise indicated.

Figure 1:
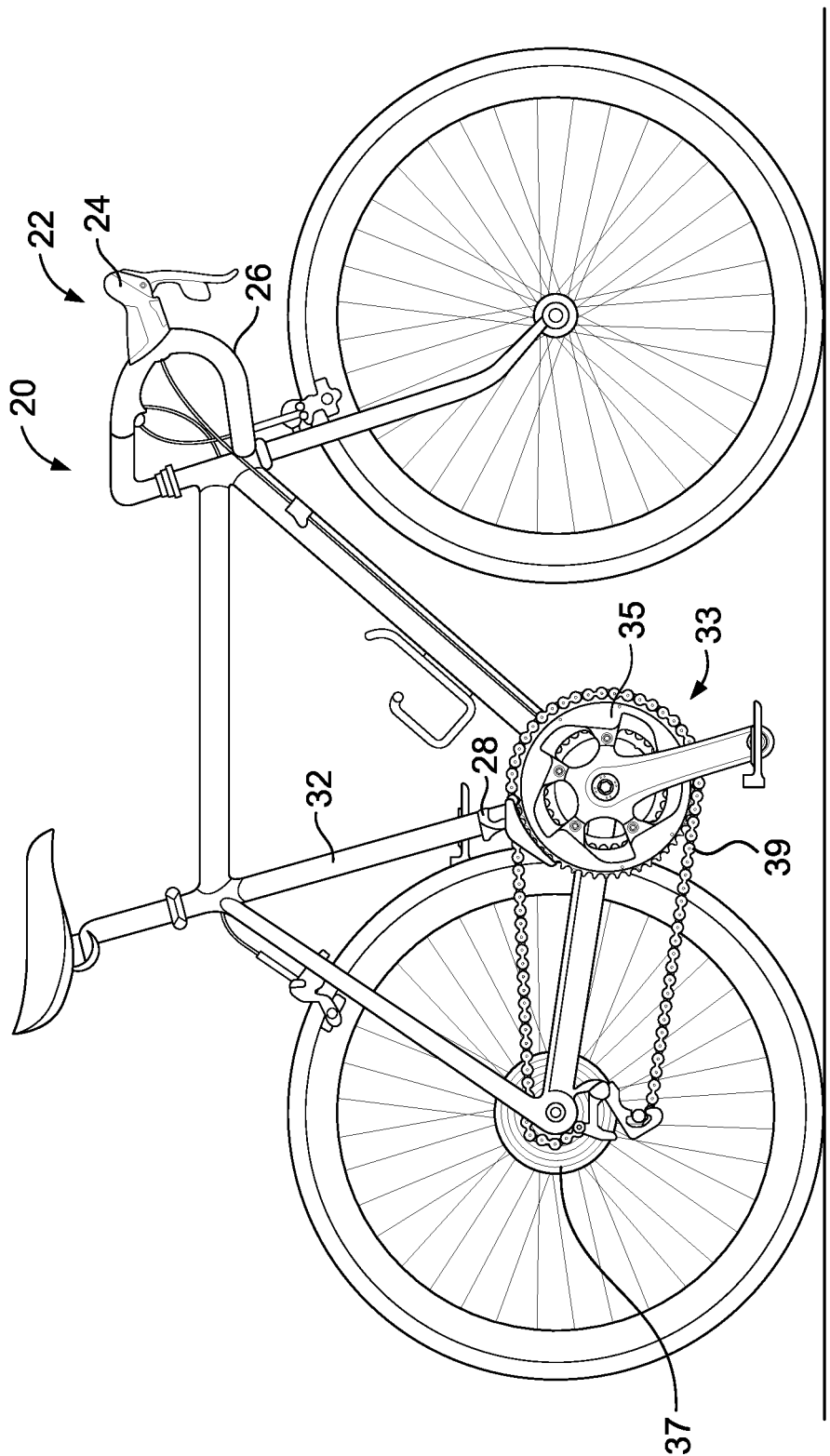
FIG. 1 is a side view of a drop-bar style bicycle with wireless components installed thereon.

Referring to FIG. 1, a bicycle 20 with a drop-bar type handlebar is shown with a wireless communication/control system 22 in accordance with one embodiment of the invention. The wireless control system 22 includes at least one shift unit 24 (shifter) which may be mounted to a bicycle handlebar 26 attached to the bicycle. The bicycle 20 wireless control system 22 also may have one or both of an electro-mechanical front gear changer 28 and an electromechanical rear gear changer 30 mounted to the bicycle frame 32 part of the bicycle 20. The gear changers 28, 30 may be derailleurs or internal gear hubs, for example. The control system 22 may be usable with other systems and/or components of the bicycle 20, such as suspension components and systems, controllable seat posts, power meters, cadence meters, lighting, bicycle computers, and so on, in addition to gear changers or in the alternative to gear changers. For context, the bicycle 20 will typically have a drive assembly 33, with one or more front chainrings 35 connected to a plurality of rear sprockets 37 by a chain 39 as is known in the art.

Figure 2:
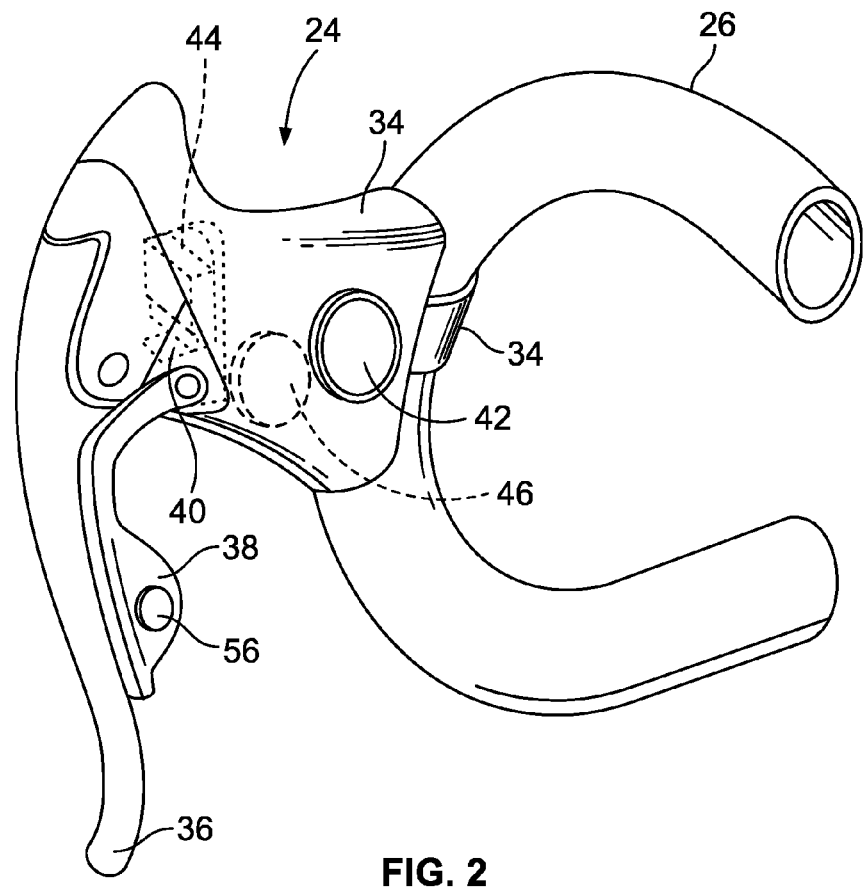
FIG. 2 is a view of a shifter/brake assembly with an integrated master control unit (MCU)

FIG. 2 shows a drop bar shift unit 24 in greater detail. The shift unit 24 may include a brake support bracket 34 mountable to a handlebar, a brake lever 36, a shift lever 38, (which is one form of a shift actuator, e.g., a button or the like), operatively coupled to a shift switch 40, a front gear changer shift toggle button 42, and a master control unit 44, and a power source such as a battery 46. Shift switch 40 may be actuated by any suitable actuator/device, such as a momentary contact button, for example.

Figure 6:
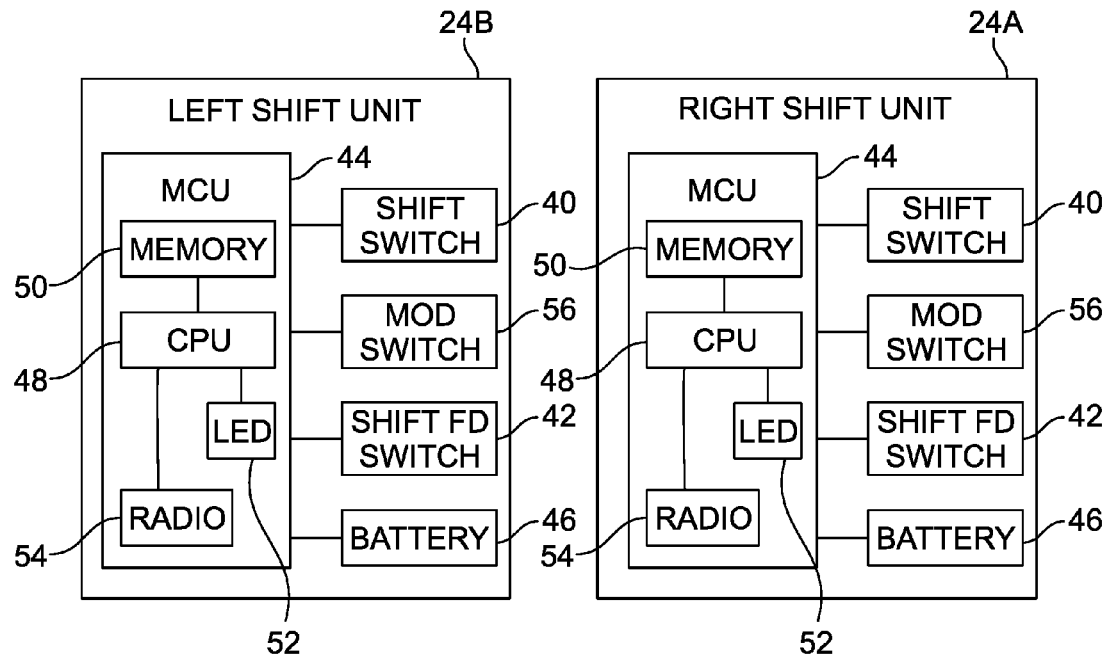
FIGS. 6-9 are schematic views of a wireless communication/control system.

Referring also to the embodiment of FIG. 6, the master control unit 44 may receive input signals from the shift switch 40 and front gear changer (FD) shift toggle button 42, and also includes a processor, CPU 48, provided in communication with the shift switch for processing the input signals, a memory component 50 in communication with the CPU, an optional indicator such as a LED 52 to display status signals generated by the CPU, and a wireless transmitter and receiver 54. It will be noted that the term "transmitter and receiver", as used herein may include a transceiver, transmitter-receiver, or at least one radio, and contemplates any device or devices, separate or combined, capable of measuring, transmitting, and/or receiving wireless signals, including shift signals or control, command or other signals related to some function of the component being controlled. For example, functions of the at least one radio may be described with respect to particular radios (e.g. a noise radio and/or a receiving radio). As such, this may describe multiple distinct radios performing the respective function (e.g. a distinct noise radio listening for noise and/or a distinct receiving radio listening for communication signals of a control unit), or it may describe a singular radio operable or configured for multiple modes of operation and/or the performance of multiple functions. It is contemplated that the transmitter and receiver 54, master control unit 44 and CPU 48 may each be integral parts of a shift control unit 24.

Shift units 24 may be supplied in pairs 24a, 24b and are typically installed on the handlebar 26, or a similar component, with one shift unit located to be operated with the right hand and the other to be operated with the left hand. When two separate shift units are employed, there may be a pair of master control units (MCU) 44 in the system 22, one in each of the two units 24a, 24b. Shift units 24 may be positioned anywhere within reach of the user, and multiple units and or shift switches 40, or the like, may be positioned thereon, such as in the type of bicycle known as a time trial bicycle which can have shift units on both the bars and bar extensions.

In one embodiment, for example, the CPU 48 used may be an Atmel® ATmega324PA microcontroller with an internal eeprom memory and the transmitter and receiver 54 used may be an Atmel® AT86RF231 2.4 GHz transceiver utilizing AES encryption and DSS spread spectrum technology supporting 16 channels and the IEEE 802.15.4 communication protocol. Other suitable CPUs and wireless transmitter and receivers are contemplated.

In one embodiment of the wireless control system 22, the shift lever 38 on the right shift unit 24a, when actuated, causes the generation of a shift signal corresponding to an upshift, which is actuatable by the rear gear changer 30. The shift lever on the left shift unit 24b, when actuated, causes the generation of a shift signal corresponding to a downshift, which is actuatable by the rear gear changer 30. Upshift corresponds to a gear shift to a higher gear (e.g., smaller rear sprocket 37) and downshift corresponds to a gear shift to a lower gear (e.g., larger rear sprocket 37). A front shift actuator 42, which may be in the form of a button, and is an optional element, may be provided on both shift units 24 and when operated, transmits a toggle front shift signal to toggle the front gear changer 28. Therefore, each MCU 44 of each shift unit 24 can wirelessly transmit shift signals that are receivable and may be actuatable by each gear changer.

It may also be desirable to add a modifier actuator 56 to, for example, the shift unit 24. A modifier actuator 56, which may be in the form of a button, does nothing when operated alone, but when operated in combination with another actuator causes the generation of a different type of signal (i.e., not a shift signal). For example, when the shift lever 38 of unit 24a is pressed in combination with the modifier actuator 56 a "shift alignment inboard" or trim command, or the like, can be issued instead of an "upshift" command. The modifier actuator 56 may be located on the shift lever 38 and be in communication with the MCU 44.

Figure 3:
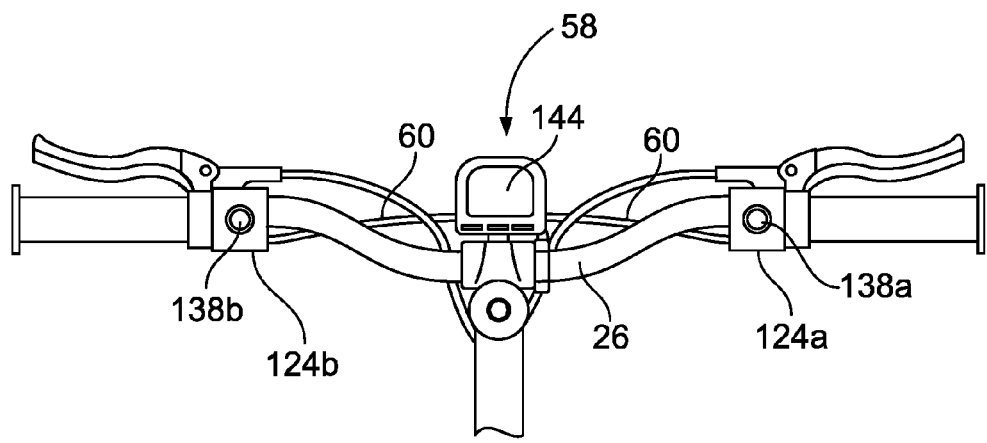
FIG. 3 is a flat type bar with shift units wired to a discrete control unit.
Figure 8:
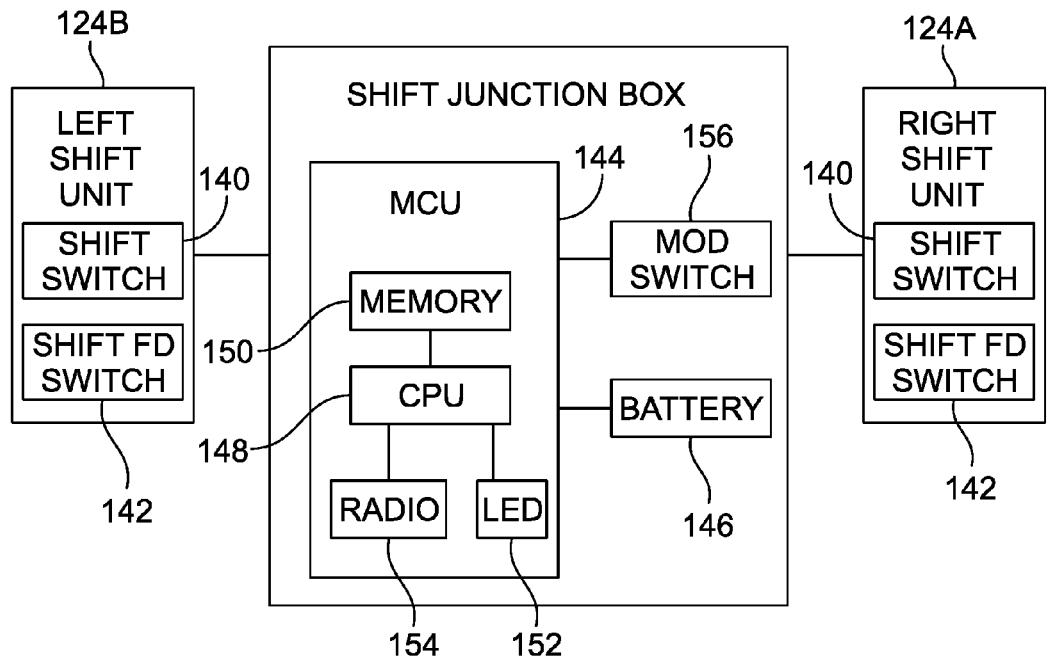

FIG. 3 shows another embodiment with the system 22 adapted to a flat-bar application. In this embodiment, right and left shift units 124a, 124b are provided. A shift junction box 58 may be connected by signal wires 60 to the right shift unit and left shift units 124a, 124b. A single master control unit 144 may be located in the shift junction box 58 that receives signals from the left and right shift units 124a, 124b (FIG. 8). The single master control unit 144 includes components similar to those of MCU 44 in the shift units 24. Specifically, the MCU 144 includes a CPU 148 in communication with the left and right shift units 124a, 124b, a memory component 150 in communication with the CPU, a transmitter and receiver component 154, and a LED 152 to indicate operating conditions of the MCU 144. A battery 146 provides power to the MCU 144 and a modification actuator 156 is provided to modify the operation of the MCU.

Although this flat-bar embodiment is shown with a shared single master control unit 144, two master control units could be employed. Alternatively, junction box 58 and shared master control unit 144 could be employed in the drop bar version described above. Each of the shift units 124a, 124b may have a shift switch 140, which is responsive to the shift levers 38 of shift unit 24 described above.

Figure 4:
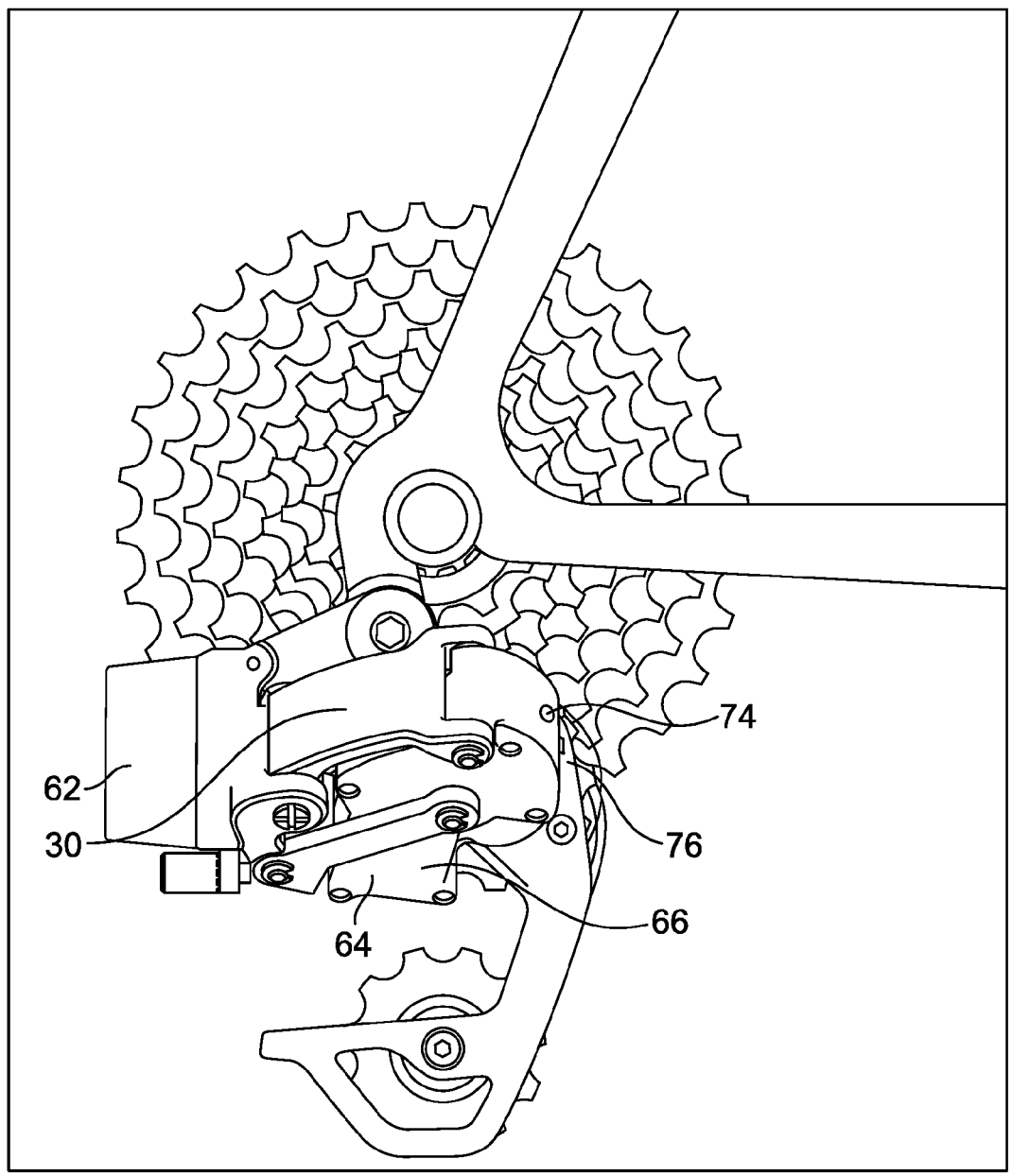
FIG. 4 is a rear gear changer according to an embodiment of the present invention.

An embodiment of an electromechanical rear gear changer 30 (RD) is shown in FIG. 4. In general, electromechanical gear changers are known in the art. The present rear gear changer includes a power source 62 (battery), a motor unit 64, and a gear changer control unit 66 (SCU or "slave control unit"). The gear changer control unit 66 (FIG. 7) may include a CPU 68 to process signals/commands, and the like, a wake sensor 70 operatively connected thereto, a memory component 72, a function button 74, an indicator such as a LED 76, an output 78 to send control signals to the motor unit 64, and a transmitter and receiver 80 for sending and receiving wireless signals. The motor unit 64 receives and executes position trim commands and/or gear change commands from the gear changer control unit 66.

Figure 5:
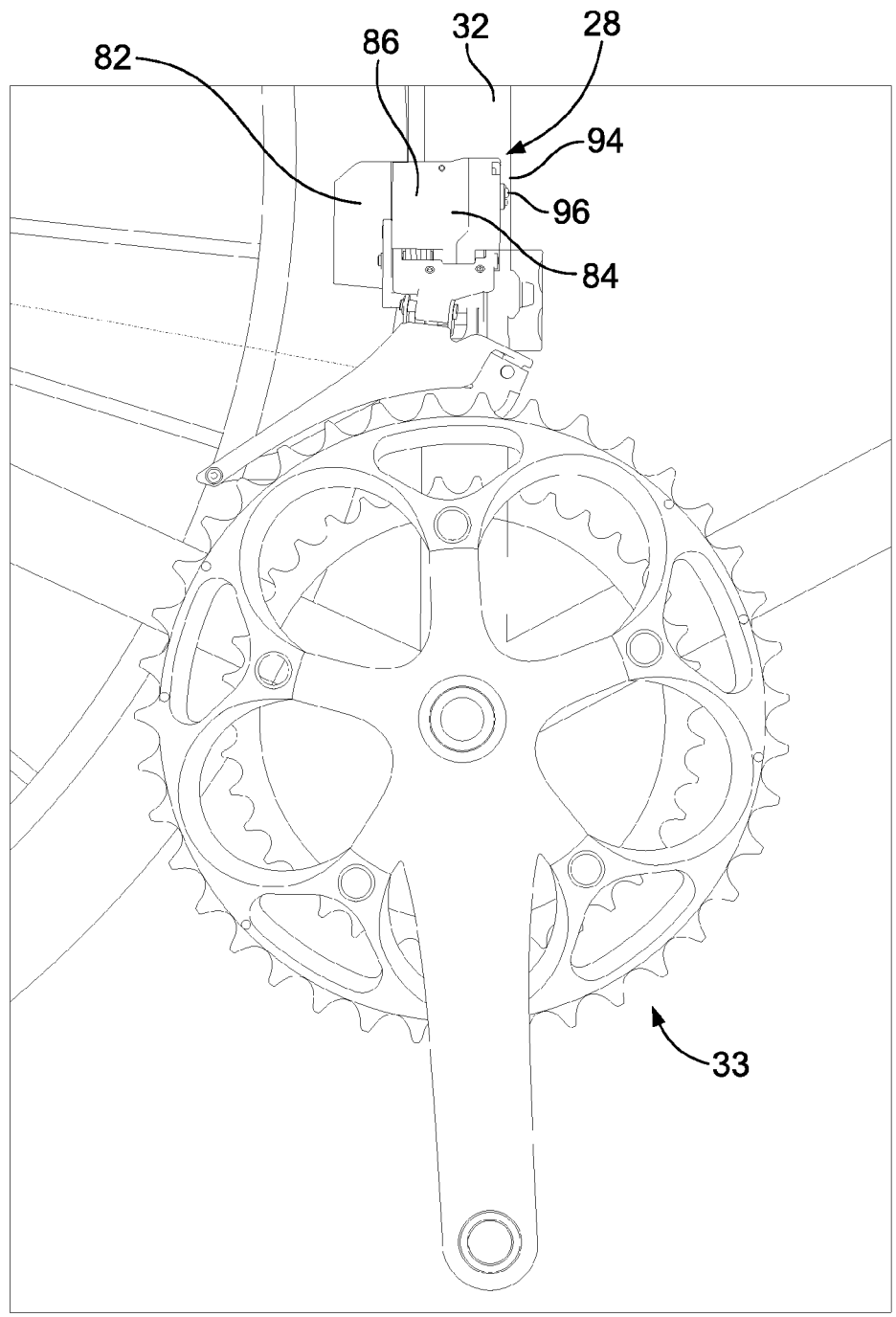
FIG. 5 is a front gear changer according to an embodiment of the present invention.

An embodiment of an electromechanical front gear changer 28 (FD) is shown in FIG. 5. Like the rear gear changer described above, the front gear changer has a power source 82 (battery), a motor unit 84, and a gear changer control unit 86 (SCU). The gear changer control unit 86 (FIG. 7) may include a CPU 88 to process signals/commands and the like, a wake sensor 90 operatively connected thereto, a memory component 92, a function button 94, an indicator such as a LED 96, an output 98 to control/operate the motor unit 84, and a transmitter and receiver 100 for sending and receiving wireless signals, which may also be referred to as a gear changer transmitter and receiver. The motor unit 84 receives and executes position and/or gear change commands from the gear changer control unit 86. In the illustrated embodiment, the front gear changer shifts between two chainrings. Alternatively, more than two chainrings are contemplated. The CPU 88 may also be configured to toggle shift the front gear changer 28 between two chainrings when the function button 94 is pressed then released.

Figure 9:
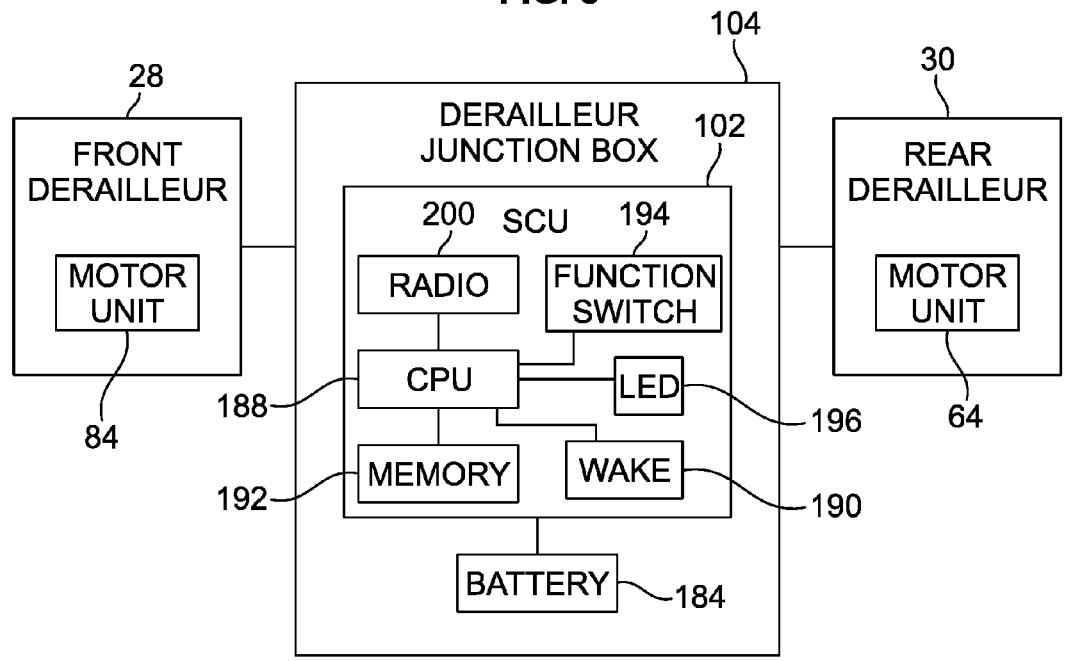

Referring also to FIG. 9, while the rear gear changer 30 and front gear changer 28 is described as each having a gear changer control unit, a single shared gear changer control unit 102 could be employed. The shared gear changer control unit 102 shown is located in a gear changer junction box 104, but could also be located within the rear gear changer 30 or front gear changer 28. The shared gear changer control unit 102 may include a power source 184 (battery). The gear changer control unit 102 may include a CPU 188 to process signals from the MCU 144, a wake sensor 190, a memory component 192 coupled to the CPU, a function switch 194, a LED 196, and a transmitter and receiver 200 configured to send and receive wireless signals.

In one embodiment, the CPU 88 or 188 may be an Atmel® ATmega324PA 8-bit RISC microcontroller with an internal eeprom memory. The transmitter and receiver 100, 200 may be an Atmel® AT86RF231 2.4 GHz transceiver utilizing AES encryption and DSS spread spectrum technology supporting 16 frequency channels and the IEEE 802.15.4 communication protocol.

Channel Selection

It is possible to set the system 22 to one of a plurality of different selectable transmitter and receiver frequency channels to avoid crosstalk with other systems in the vicinity. A device may be designated in the system 22 to be the channel master. The channel master device may be the rear gear changer 30. Prior to pairing devices, (i.e., the shift unit(s) and gear changer(s)), the rear gear changer 30 would be set to a particular transmitter and receiver frequency channel. This could be accomplished by pressing the function button 74 in a certain sequence, or could be accomplished with a selector switch, or could be accomplished by wireless communication with a device designed to perform such a task. It is considered that it would be within the skill of the ordinary artisan to accomplish such a task.

Pairing

The components of the wireless control system 22 are paired to enable wireless communication therebetween. Referring to FIG. 2 and FIGS. 4-7, each Master Control Unit 44 has a unique device identification ("device ID") value and a "device type" value permanently stored in the MCU memory component 50. The "device type" value indicates the type of device it is, for example: "right shifter unit" or "left shifter unit".

For purposes of illustrating an embodiment of a pairing operation, an example with a front gear changer will be illustrated. It will be understood that the basic steps will be the same for a rear gear changer. The front gear changer 28 containing a gear changer control unit 86 (SCU) is paired with a shifter 24 containing a MCU 44 as follows. When a mode changing mechanism, which may be in the form of a function button 94 on the gear changer, is pressed for a pre-determined period of time, the SCU 86 of the gear changer enters or is converted to a pairing mode. The SCU 86 may slowly flash the LED 96 on the gear changer 28 to indicate that it is in pairing mode and turn on the SCU transmitter and receiver 100. At this time, the receiver part of transmitter and receiver 100 in the SCU 86 scans transmitter and receiver channels, listening for transmitted signals, wherein listening may also be referred to as monitoring. Next, a shift lever/button 38 on the shift unit 24 with a MCU 44 is pressed and held, causing the MCU to transmit a repeating shift signal that contains the "device ID" and "device type" as part of the signal. When the SCU 86 in the gear changer 28 detects the repeating shift signal from a MCU 44, the SCU may change the LED 96 to solid on. The SCU receiver part of transmitter and receiver 100 continues to listen for a repeating shift signal from the MCU 44 of the shifter for a pre-determined time period, which may be about two seconds. Once the SCU 86 of the gear changer 28 has determined that it has received a shift signal from the MCU 44 for the required period of time, the SCU exits the pairing mode and stores the "device ID" in the SCU memory component 92 in a space reserved for that "device type". If the SCU 86 is the channel master in the system 22, it will also send a signal to instruct the MCU 44 in the paired shifter 24 to operate on a particular channel. The shifter 24 and gear changer 28 are now paired and the gear changer's SCU 86 will respond to commands from the MCU 44 of the paired shifter.

The memory 92 of the SCU 86 of the gear changer 28 will only record one device ID for each device type. If a shifter 24 with a device id of "234" is paired with a rear gear changer 30, and later another shifter 24 with the device ID "154" is paired with the rear gear changer, the SCU 72 memory value "234" in the "device type" space will be overwritten with the new value "154," and the rear gear changer 30 will no longer respond to the shifter 24 of device ID "234."

Figure 7:
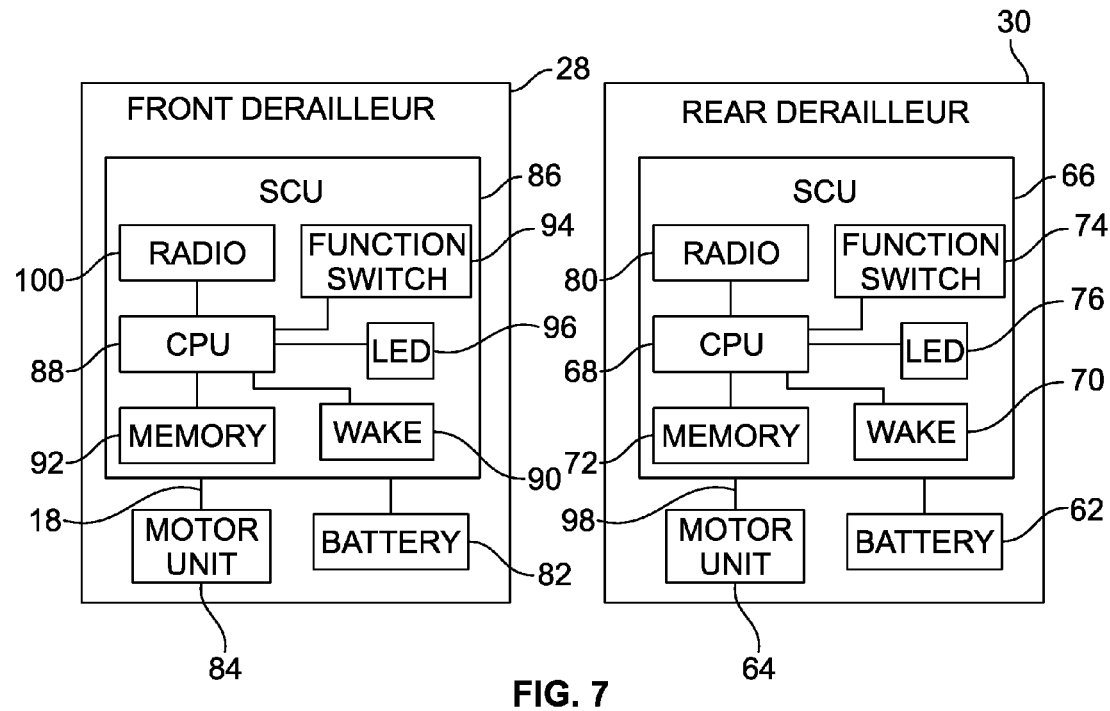

An embodiment of the wireless system 22 has right and left shifters 24a, 24b; each with a MCU 44, and a front gear changer 28 and a rear gear changer 30, each with a SCU 86, 66 (FIGS. 6 and 7). Therefore, it will be understood that the pairing process will be repeated four (4) times for this embodiment. The rear gear changer 30 will be paired to each of the right and left shifters 24a, 24b and the front gear changer 28 will be paired to each of the right and left shifters. This creates a highly secure system because physical access is required to press the buttons on the components to pair the devices. Further, each gear changer 28, 30 will respond only to shifters with which they have been paired. If the operator verifies that each shifter 24a, 24b controls each of the gear changers 28, 30, they can be confident that no unauthorized shifters have been paired. In an alternative embodiment, where a pair of shifters 124a, 124b shares a MCU 144 or the front and rear gear changers 28, 30 shares a SCU, the number of pairing steps will be reduced.

Wake Sensor

Conserving power on battery powered wireless devices is a design consideration and one contemplated by embodiments of the invention. If electronic devices are left on continuously, batteries tend to be quickly depleted. Therefore, various strategies may be implemented to conserve battery power. The MCU 44 connected with the shift unit(s) 24 may be configured to sleep, i.e. are in a relatively low-power state when the bicycle/system is inactive. During this time, the CPU 48 is in the low power state (sometimes known as standby or sleep mode) and the transmitter and receiver 54 is turned off. The MCU 44 only wakes (becomes fully powered and operational) and transmits signals when a switch or button is activated, otherwise it sleeps.

Figure 10:
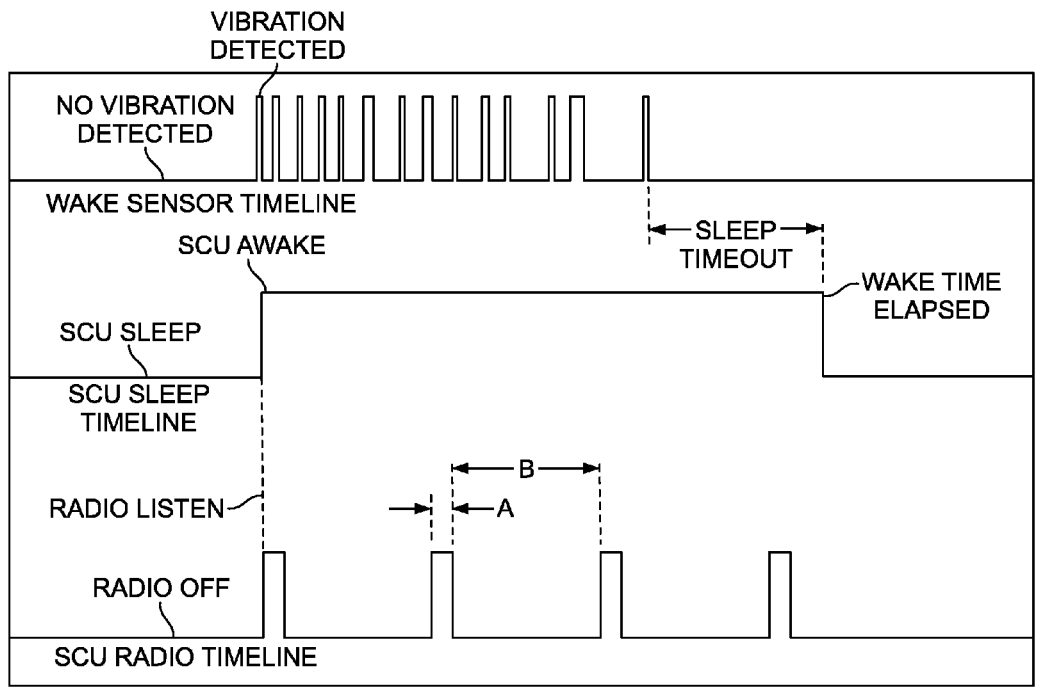
FIG. 10 is a wake/sleep timeline of a gear changer control unit (SCU)

For example, the SCU 66 in the gear changer 30 may receive control signals from the MCU 44 or, in some cases, other SCUs. If the transmitter and receiver 80 is left on continuously, the battery 62 would be quickly depleted. The SCU 66 may include a wake unit 70 to determine and signal when the bicycle is being used. In one embodiment, for example, a SignalQuest™ SQ-MIN-200 or a Freescale™ Semiconductor MMA8451Q vibration sensor may be used as a sensor for the wake unit. When operating a bicycle, vibrations are caused by uneven road surfaces and drivetrain motion, which are easily detected by sensors (not shown). Other sensors could be used for the wake unit 70, such as accelerometers or magnetic reed switches configured to detect magnets attached to moving elements of the bicycle 20. When the bicycle 20 is operated, vibration or movement is detected and the wake unit 70 sends a wake signal to wake the SCU 66 (FIG. 10). The SCU 66, upon becoming fully powered and operational from a wake signal from the vibration sensor, becomes awake as long as it receives wake signals from the wake unit 70. If wake signals are not received for a period that exceeds a predetermined sleep timeout value, the SCU 66 will go back to sleep. The duration of the sleep timeout may be about 30 seconds.

Transmitter and Receiver Timing

Power consumption can be further reduced by frequently turning transmitter and receivers 80, 100 on and off according to a predetermined or given period or cycle when the SCU 66, 86 is awake. When the SCU 66, 86 receives a signal from the wake sensor 70, 90 it enters an awake mode, becoming fully powered and operational. During the awake mode, the SCU 66, 86 turns the transmitter and receiver 80, 100 "on" to monitor for shift signals for a listen time A, which may be known as a listen mode, and then "off" for a wait time B, which may be known as a non-listen mode, to conserve energy as shown on timeline SCU on the chart. The total of one cycle of time A and B defines a given awake mode cycle period or awake mode cycle time. Typically, listen mode time A might be about 5 ms and wait time or non-listen mode B might be about 45 ms. In this state, the SCU transmitter and receiver 80, 100 is on (in listen mode) only about 10% of the time of the awake mode cycle time.

Figure 11A:
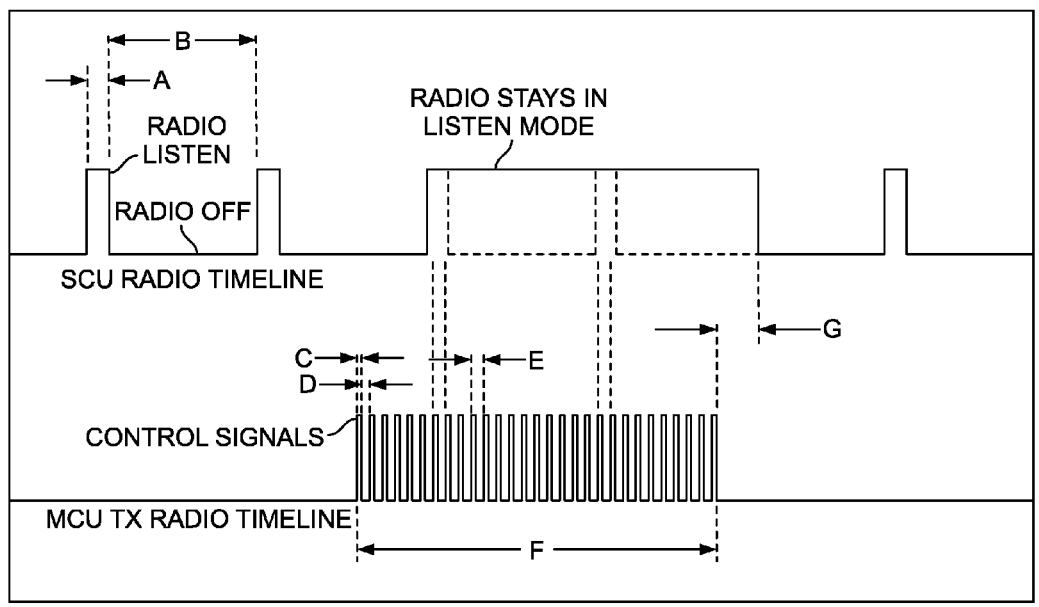
FIG. 11A is a timeline of the SCU transmitter and receiver and the MCU transmitter and receivers.

FIG. 11A shows the transmitter and receiver timing when control signals are transmitted from the MCU 44 to the SCU 66, 86. The control signals may be any type of signals used to facilitate control of a bicycle and/or bicycle component. For example, the control signals may be seatpost adjust signals, suspension adjust signals, or shift signals. After a shift button 38 on the shift unit 24 is pressed, the MCU 44 enters a wake mode or state, waits for the channel to become clear, and transmits a series of duplicate control/shift signals if no other signals or noise are detected. Each of the duplicate shift signal has a duration time of C (about 1 ms) followed by a rest period time D (about 2 ms) and is repeated for a length of time, i.e., a message duration time F (about 100 ms). The message duration time F is chosen so that the shift signal from the MCU 44 will coincide with at least one time when the transmitter and receiver 80, 100 of the SCU 66, 86 is actively monitoring or listening, i.e. in a listen mode. In the example shown in FIG. 11A, four control signals coincide with the time the SCU transmitter and receiver 80, 100 is in listen mode, as illustrated by the dashed lines. In other words, the gear changer transmitter and receiver actively listens for the shift signals from the shifter transmitter and receiver during a part, i.e. a listen time period, of an awake mode cycle time and the shifter transmitter and receiver is configured to transmit the shift signals for a length of time which is greater than the awake mode cycle time to ensure that the gear changer transmitter and receiver will be in a state of active listening when a shift signal is being transmitted, wherein listening may also be referred to as monitoring.

Figure 11B:
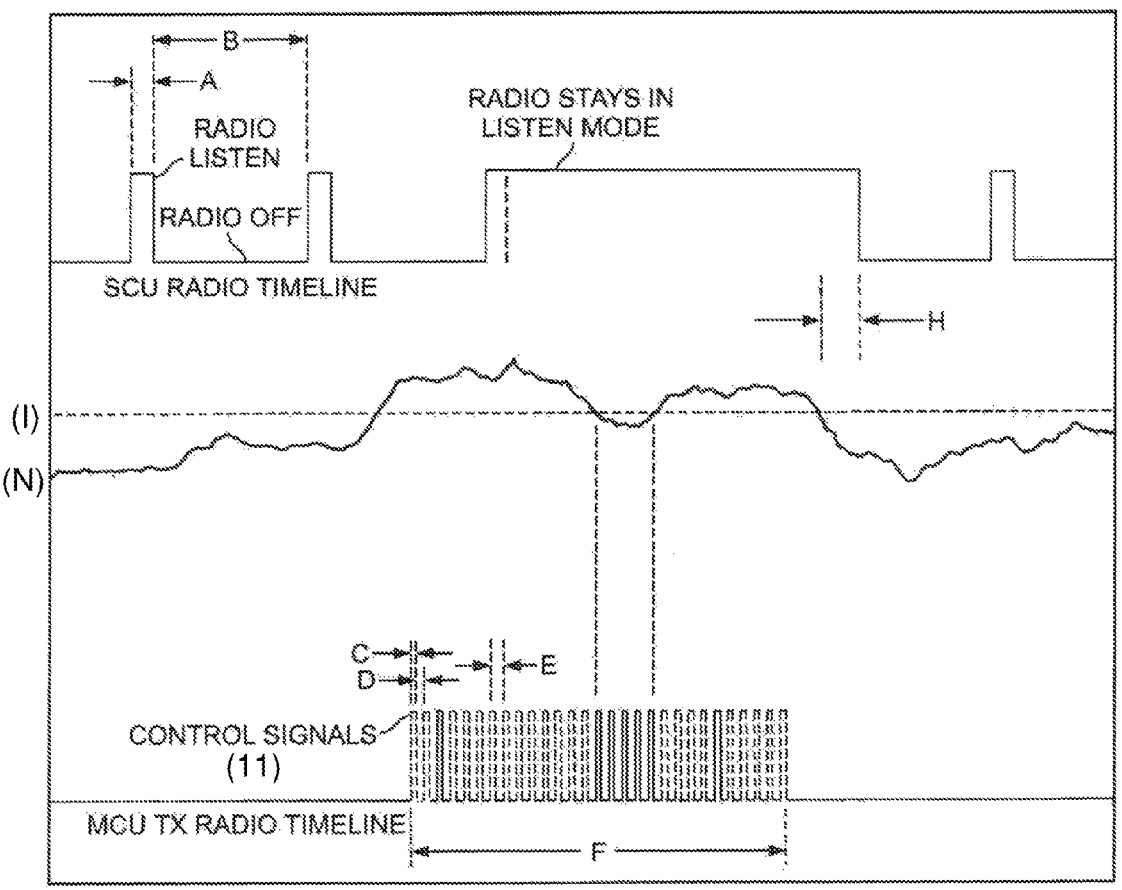
FIG. 11B is a timeline of the SCU transmitter and receiver and the MCU transmitter and receivers according to an embodiment of the present invention.

FIG. 11B shows the transmitter and receiver timing when control signals 11 are transmitted in a noisy environment. In this embodiment, the receiver 80, 100 of the SCU 66, 86 detects and/or otherwise measures a noise level N. The noise level N is an environmental variable dependent on the presence of nearby electrical transmissions. These local electrical transmissions create background noise that may be designated with a proportional value. For example, the value may denote a measure of energy spectral density. In this embodiment, the SCU transmitter and receiver 80, 100 may monitor and measure the noise level N whenever the SCU transmitter and receiver 80, 100 is in the listen mode in order to make a noise level threshold determination. The SCU transmitter and receiver 80, 100 may be configured to detect noise only on a singular frequency channel, so that only noise affecting the frequency channel selected for transmission and receiving is measured.

The noise level threshold determination may be through a comparison of a measured noise level value with a noise level threshold. A noise level threshold may be a value selected as appropriate for determining a probability of reliably receiving a control signal. For example, a noise level threshold I may be a value selected from a range between −70 decibels relative to 1 milliwatt or "dBm" to −40 dBm. In an embodiment, the noise level threshold I may be −50 dBm, −55 dBm, −60 dBm, or −65 dBm. If the SCU transmitter and receiver 80, 100 determines a detected noise level has achieved the noise level threshold I, then the SCU will remain in listen mode for a first extended time period H1. The first extended time period H1 may be any length of time. For example, the time period may be less than one ("1") second, such as 250, 500, or 750 milliseconds. The device may also be configured to further extend the activation of the listen mode for a second extended time period when the SCU transmitter and receiver 80,100 determines the noise level threshold I has been achieved during the first extended time period H1. The second extended time period H2 may also be any amount of time. For example, the second extended time period may be less than one ("1") second, such as 250, 500, or 750 milliseconds. The first extended time period H1 and the second extended time period H2 may be the same or different lengths of time. In an embodiment, the first extended time period H and the second extended time period are the same.

In one embodiment, each time the SCU transmitter and receiver 80,100 periodically measures the noise level and determines that the noise level threshold I has been achieved, an extended time period H will begin from the time of determination. Because in this embodiment the extended time period H is greater than the time between detection, or sampling rate, of the SCU transmitter and receiver 80, 100, the activation of the listen mode will in effect continue until the SCU transmitter and receiver 80, 100 determines the noise level has no longer achieved the noise level threshold I, then for a further extended time period H before deactivation of the listen mode. According to this embodiment, the SCU transmitter and receiver 80, 100 will begin listen mode at the time the SCU transmitter and receiver 80, 100 determines that the noise level has achieved the noise level threshold I; remain in listen mode as long as the noise level threshold is achieved during the extended time period H; and conclude listen mode an extended time period H after the time that the SCU transmitter and receiver 80, 100 determines the noise level to have not achieved noise level threshold I.

The noise level threshold I may be configured to correspond to a noise level where control signals 11 are no longer reliably received. If a control signal 11 is sent during listen mode time A, the probability of the signal being received by the SCU transmitter and receiver 80,100 is related to the noise level N. Generally, the concentration of transmissions is higher in high noise level environments. The lower probability of receiving control signals in a high noise level environment is due to a tendency of transmissions to interfere with other transmissions. When there is a high concentration of transmissions, as is generally the case in high noise level environments, there is a relatively lower probability of receiving control signals. It is less likely that the SCU transmitter and receiver 80, 100 will receive any of a plurality control signals in a given time period if the noise level N achieves a noise level threshold I. By extending the listen duration time by an extended time period H when the noise level N achieves a noise level threshold I, the length of the listen duration time is increased and therefore the probability of the SCU transmitter and receiver 80, 100 receiving control signals 11 increases. When the SCU transmitter and receiver 80, 100 hears a shift or control signal, the SCU 66, 86 keeps the transmitter and receiver in listen mode, even if the detected signals are intended for another device.

The SCU transmitter and receiver 80, 100 will stay in listen mode for a listen duration time G after the last signal is received before going back to sleep, i.e. the non-listen mode, to conserve power. Listen duration time G may be any length of time. For example, listen duration time G in an embodiment could be less than one (1) second, such as 20 milliseconds, 40 milliseconds, or 80 milliseconds. It will be understood that the various timings illustrated herein are exemplary in nature.

Figure 11C:
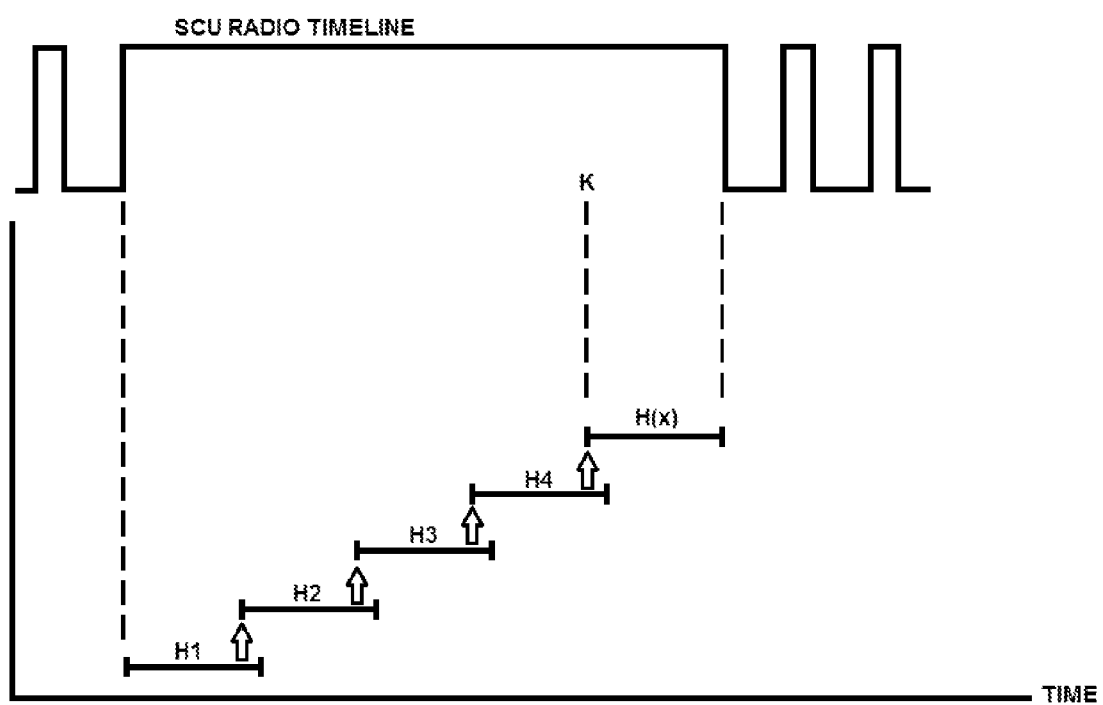
FIG. 11C is a timeline of the SCU transmitter and receiver according to an embodiment of the invention.

FIG. 11C shows a timeline of the possible extended time period for which the radio will listen according to one embodiment. The beginning of extended time period H1 corresponds to an initial noise level detection having achieved the noise level threshold I. If the radio then detects a noise level achieving the noise level threshold I during the extended time period H1, then the radio will begin to listen for an extended time period H2 from the time of detection. The radio may perform a plurality of noise level detections during the extended time period H1. In an embodiment, if even only a limited number, e.g. as few as one ("1"), of the plurality of noise level detections achieves the noise level threshold I, then the radio will begin to listen for the extended time period H2. Because interfering signals are generally transmitted intermittently in packets, it may be possible that only a few of the plurality of noise level detections achieve the noise level threshold I, in what is in fact a noisy environment where signals are likely to be lost.

FIG. 11C depicts a cascade of such noise level detections, each triggering an extended time period. The cascade has transitions at which a new extended time period begins, signified by arrows in FIG. 11C. Similar to the above, if a noise level detection achieves the noise level threshold I during the extended time H2, then the radio will listen for an extended time H3. If a noise level detection achieves the noise level threshold I during the extended time H3, then the radio will listen for an extended time H4. This cascade will continue until a conclusion of an extended time following the last-in-time noise level detection achieving the noise level threshold I, represented by H(x).

During racing or large group rides it is inevitable that cyclists will be using a number of systems in detectably close proximity. Both the MCU 44 and SCU 66, i.e., 86, may have special features to enable coexistence and ensure high reliability during crowded use. The MCU transmitter and receiver 54 has the ability to both transmit and receive signals. Prior to transmitting a wireless signal, the MCU 44 will listen to determine if other transceivers or transmitting devices are transmitting. These other transceivers may or may not be part of the instant system. When the MCU 44 hears other transceivers, prior to transmitting, it will observe the device ID(s) of the other signal(s) and count these devices until it sees a device repeated. When the MCU 44 determines that the channel is clear to transmit after hearing other transmissions, (i.e., any transmission that is not from a master control unit to which either of the SCUs 66, 86 is paired, wherein the other transmissions may be referred to as noise), it will begin transmitting a signal but may adjust the repeat interval by increasing the time between transmissions of the duplicate signals to avoid collisions with the other transmissions/noise.

Figure 13:
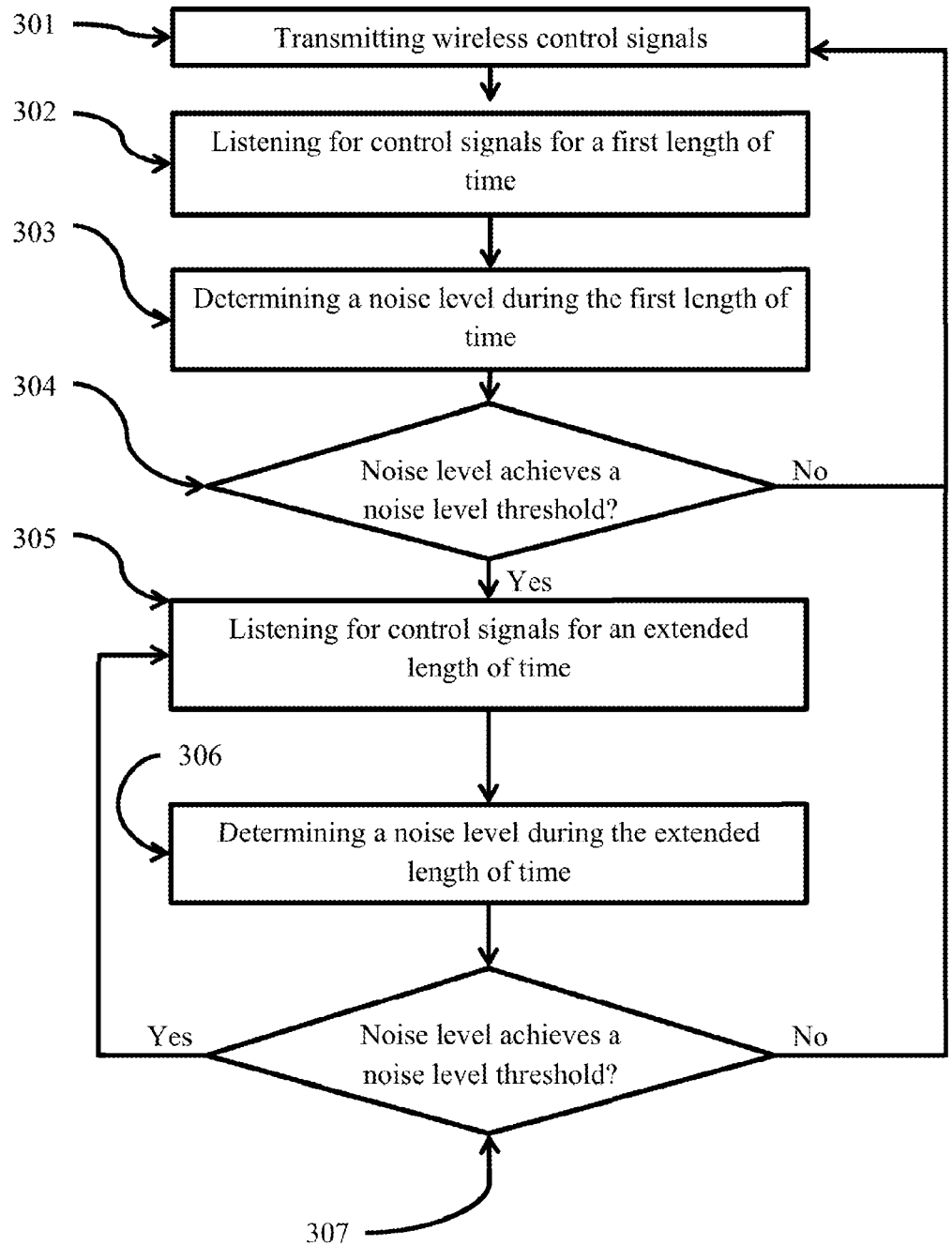
FIG. 13 is a flow chart illustrating wireless transmitting and receiving according to an embodiment of the present invention.

FIG. 13 is a flowchart illustrating a method for transmitting and receiving wireless control signals on a bicycle. As presented in the following sections, the acts may be performed using any combination of the components indicated in FIGS. 6-9. For example the following acts may be performed by a radio 80, 100, 200 and/or a CPU 68, 88, 192, as well as additional or other components. Additional, different, or fewer acts may be provided. For example, Act 301 may be omitted. The acts are performed in the order shown or other orders. The acts may also be repeated.

The method may include transmission of wireless control signals (Act 301). The transmission may be performed by one or more shift units 24A, 24B. The transmission may be directed towards a radio, such as the radio 100, 80 of the front and/or rear derailleurs 28, 30.

The method further includes listening for a first length of time for control signals (Act 302). The control signals may be transmitted by a control unit of a bicycle on a communication frequency channel. The listening may be achieved by a radio, such as the radio 100, 80 of the front and/or rear derailleurs 28, 30.

The method determines a noise level during the first length of time (Act 303). The noise level may be the same noise level N, measured on a frequency channel. In an embodiment, the determination of the noise level N is carried out by a radio, such as the radio 100, 80 of the front and/or rear derailleurs 28, 30. The radio 100, 80 may be configured to use a processor, such as CPU 88, 68 to perform the determination of the noise level N. The determination of the noise level provides the processor with information useful to achieve a balance between the successful transmission of signals and low power consumption.

In Act 304 it is determined whether the noise level achieves a noise level threshold (304). The determination of the noise level N from the previous step is then applied to further determine whether the noise level N has achieved a noise level threshold I.

If the threshold has been achieved, then the method proceeds to listen for control signals for an extended length of time (305). Similar to listening for control signals for a first length of time, the listening for an extended length of time may be performed by a radio, such as the radio 100, 80 of the front and/or rear derailleurs 28, 30. The noise level threshold can be achieved when a relative measurement of the detected noise level corresponds to a noisier environment than does the noise level threshold. For instance, the noise level threshold could be set at −50 dBm, such that a detected noise level less than −50 dBM, such as −55 dBm will achieve the noise level threshold. Alternatively, the noise level may be measured in absolute units, such that a detected noise level greater than the noise level threshold will have achieved the noise level threshold. In other words, a noise level of greater absolute magnitude than the noise level threshold will achieve the noise level threshold. In one embodiment, if the noise level does not achieve a noise level threshold, then the method starts over (301).

Although the transmission of wireless control signals to a radio (301) is listed once, it should be recognized that this transmission may take place at any point throughout the method. For example, a second transmission of wireless control signals to a radio could take place concurrently or subsequently to a first transmission of wireless control signals to the radio.

The method may further include a determination of the noise level with the processor during the extended length of time (306). In such an embodiment, the method may proceed to listen with a radio for control signals for an extended length of time (305) again if the noise level achieves the noise level threshold (307). Similarly, if the noise level threshold has not been achieved (307), then the Act 301 of transmitting wireless control signals to a radio may be repeated.

The method illustrated in FIG. 13 represents one particular option to adjust wireless transmission behavior in response to noise levels. The listening for a first length of time (Act 302) in a quiet environment and the listening for an extended length of time (Act 305) in a noisy environment may strike a balance between effective wireless communication and battery consumption. The noise level thresholds may be adjustable features that can be altered manually or in response to other measures of likely successful or unsuccessful communication. One such responsive alteration may be the comparison of control signal count values, as below in the discussion of handling multiple shift commands. For example, if at a given moment the noise level does not achieve the noise level threshold, yet a control signal has a count value more than one count value removed from that of the last-received control signal, the noise level threshold may be adjusted to a level that would be achieved with the instant noise level. Such an adjustment would result in listening for an extended length of time, thus increasing the of a control signal being received. Optionally, the noise level threshold can be adjusted if, at a given moment, the noise level does achieve the noise level threshold yet sequential control signals are received.

Figure 12:
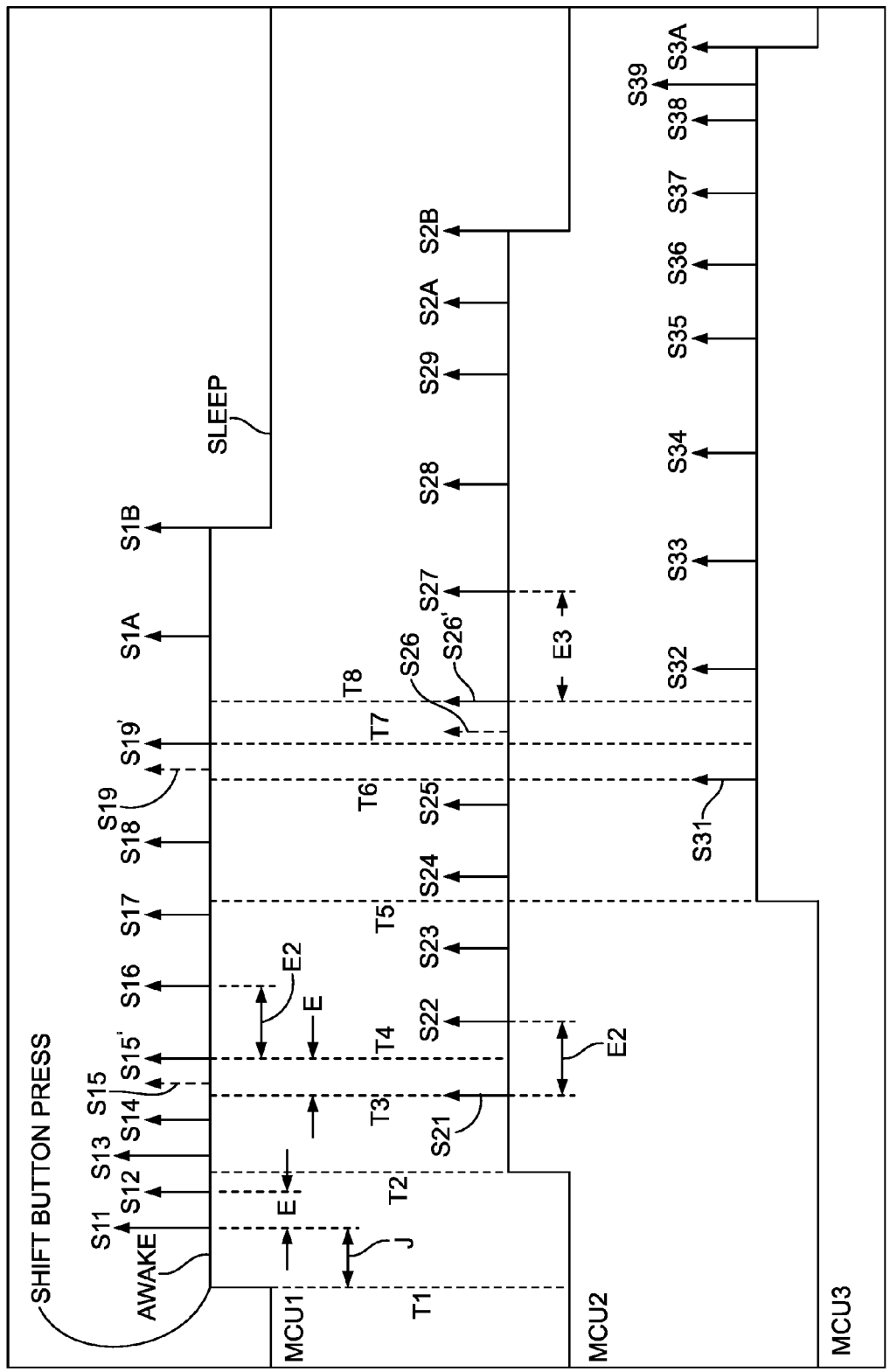
FIG. 12 is a wake/sleep/TX timeline of the MCUs.

FIG. 12 shows the interaction of three MCUs that attempt to transmit at the same time. The timeline MCU1 shows the sleep (low power mode), wake (fully powered and including an actively monitoring mode), and transmit (TX) states of the first MCU. When a shift actuator is operated, the MCU wakes and pauses to listen for a quiet time (J) before transmitting signals (S11-S14). Since no other signals or noise in this example were heard during quiet time J, S11-S14 are repeated at a minimum repeat rate E (about 3 milliseconds). When the MCU is awake, between transmitting signals, it listens for signals from other transmitters.

MCU2 wakes from a TX command request and begins listening at time T2. After MCU2 receives signal S13 and S14, both from a common MCU, it determines that two devices will be transmitting and begins sending signals S21-S25 at time T3 and at a repeat rate E2, about 6 milliseconds. MCU2 transmits signal S21 at time T3 before S15 of MCU1, thus "bumping" S15. MCU1 was listening between S14 and the planned S15 signal and heard the signal S21 from MCU2. MCU1 then cancels S15 and begins sending a new signal S15'-S18 starting at time T4 at repeat rate E2. MCU1 chooses to send signal S15' about 3 milliseconds from T3, maintaining an interval between duplicate signals at a first interval or environmental signal repeat rate of about 3 milliseconds.

MCU3 wakes prompted by detection of a TX command request (shift signal) and begins listening at time T5. After MCU3 receives signal S24, S18, and S25, where S24 and S25 are both from a common MCU, it determines that three devices will be transmitting and begins sending signals S31-S35 at time T6 and at a repeat rate E3, about 9 milliseconds. Signal S31 was transmitted prior to the planned signal S19 of MCU1. MCU1 was listening between signals S18 and planned S19 and received S25 from MCU2 and S31 from MCU3. MCU1 then cancels S19 and begins sending a new signal S19'-S1B starting at time T7 at repeat rate E3. MCU1 chooses to send signal S19' about 3 milliseconds from T6, maintaining an environmental signal repeat rate of about 3 milliseconds. Signal S19' was transmitted prior to the planned S26 of MCU2, bumping that signal. MCU2 was listening between signals S25 and planned S26 and received S31 from MCU3 and S19' from MCU1. MCU2 then cancels S26 and begins sending a new signal S26'-S2A starting at time T8 at repeat rate E3. MCU2 chooses to send signal S26' about 3 milliseconds from T7, maintaining an environmental signal repeat rate of about 3 milliseconds.

Between S28 and S29, MCU2 observed that only S34 was received from MCU3 and determines that only two devices are now communicating. After S29, MCU2 sends signals S2A-S2B at the increased repeat rate E2. Between S34 and S35, MCU3 observed that only S29 was received from MCU2 and also determines that only two devices are now communicating. After S35, MCU3 sends signals S35-S38 at the increased repeat rate E2. Between S37 and S38, MCU3 observed that no signals were received and it alone is communicating. After S38, MCU3 sends signals S38-S3A at the increased repeat rate E.

Although the example above describes the transmitters adjusting their repeat intervals on the next transmit cycle, it may be desirable to wait more than one cycle before adjusting the repeat rate. This gives the transmitters more chances to notice other transmitters they might not have noticed on their initial tally.

There is a risk that two devices will attempt to send signals at exactly the same time. To reduce the possibility of collisions, the signal repeat rate E may be randomly varied by as much as plus/minus 1 milliseconds, for example.

Also, the invention may include a method to maximize reliability thereof by maximizing the number of sent duplicate shift signals corresponding to the input signal in a given message duration time. If the repeat interval of the plurality of duplicate shift signals creates a situation where only a small number of duplicate shift signals can be transmitted, the system may increase the length of the message duration time to transmit a sufficient number of the duplicate signals at the increased interval rate.

Handling Duplicate Shift Commands

Because the MCU 44 of the shifter 24 sends the shift signal multiple times, the SCU 66, 86 of the gear changers 30, 28 need a method of discerning duplicate received shift signals from new shift signals. When the MCU 44 generates a shift signal it also generates a "count value" that is transmitted along with the device ID and device type. The count value can be used to denote duplicate, sequential, or non-sequential shift signals. Each time a successive shift signal is generated by the MCU 44 a new count value is generated by retrieving the previous count value from memory and increasing the value by one (1), or otherwise sequentially incrementing the count value to obtain a new count value. When the SCU 66, 86 receives a shift signal it compares received count value to the previously received count value stored in the SCU memory 72, 92 for that signal type (ex: upshift, downshift) and device type (right shifter, left shifter). If the count value, signal type, and device type match the values stored in memory, the command is ignored as it is a duplicate signal that has already been processed. If the count value is different than the value stored in memory, the SCU 66, 86 will calculate a value "pending" by subtracting the count value in memory from the received count value. If the operator pushes the upshift lever once and no wireless transmissions were lost, the SCU 66 calculates a value of pending=1 and executes a command to the motor unit 64 to upshift once. Then the SCU 66 will record the new count value to memory for that signal type and device type. However, if the operator is rapidly pressing the upshift lever 38 and the system 22 is in a noisy wireless environment where wireless signals fail often, the SCU 66 may calculate a pending value greater than one. In this case a shift signal was lost, or the operator pressed the lever 38 more than once before the SCU 66 turned its transmitter and receiver on. If the SCU 66 receives a shift signal corresponding to an upshift input signal and calculates a pending value of 3, it is known that the upshift lever 38 had been operated three (3) times since the last shift signal corresponding to an upshift input signal was received, and will send a command to the motor unit 64 to upshift three (3) times. Then the SCU 66 will record the new count value to memory for that signal type and device type. The SCU 66 will also ignore signals corresponding to upshift or downshift input signals when the gear changer 30 is at the limit of its range. For this to occur, the SCU 66 will keep track of its position.

The value of noise level threshold I is preferably tunable to account for changing noise environments. Appropriate tuning of the noise level threshold I may be employed to maximally conserve battery power while maintaining good wireless performance in noisy environments. Optionally, the SCU 66 can be configured to reduce the value of noise level threshold I if it receives a number of control signals having non-sequential or particularly distant count values, indicating non-sequential or particularly distant control signals and that the SCU 66 has not received the intervening control signals as a result of noise.

In an embodiment, the SCU 66 can be configured to increase the value of noise level threshold I if the threshold has already been achieved, but the SCU 66 has nonetheless received control signals with substantially sequential count values, indicating that the current noise level is not substantially interfering with control signal transmission and receiving. A similar metric of non-sequential count values received by the SCU 66 can optionally be used to extend the activation of the listen mode of the SCU transmitter and receiver 80, 100 by an extended time period. In effect, this metric can function as an indirect noise sensor, by measuring successful transmission rather than noise, in place of, or in conjunction with, another type of noise sensor and/or noise measurement.

Other Shift Methods

The MCU 44 can also generate control signals regarding the state of the shift buttons 38 (upshift & downshift). For example, when an upshift button 38 of unit 24a is pressed, the MCU transmits an "upshift button pressed" signal and when the upshift button is released, transmits an "upshift button released" signal. This feature is useful in a system 22 where there is no dedicated front gear changer shift button 42 on the shift units and the front gear changer 28 is toggle shifted by pressing the upshift and downshift buttons 38 of both units 24a, 24b together. In the case of a front shift, the SCUs 66, 86 will first receive both an upshift & downshift button-pressed signal before receiving an upshift or downshift button-released signal, indicating that both buttons were pressed before either is released. When the SCU 86 of front gear changer 28 receives this signal sequence it will perform a front gear changer toggle shift. When the rear gear changer 30 receives this signal sequence, it will ignore them.

If the rear gear changer SCU 66 receives an upshift or downshift button-released signal without first receiving an upshift or downshift button-pressed signal, it can infer that the button-closed signal was lost or not transmitted from the MCU 44 because the button 38 was rapidly pressed and released. In this case the rear gear changer SCU 66 will go ahead and perform the upshift or downshift.

Although transmitted signals have only been described from the MCU 44, the SCU 86, 66 in the front gear changer 28, and rear gear changer 30 may also send signals to other devices. For example, the rear gear changer 30 can send a message to the front gear changer 28 indicating the current gear position of the rear gear changer. This would allow the front gear changer 28 to optimize the trim position of the front gear changer based on the position of the rear gear changer 30. Other types of data the SCU 66, 86 of a device could transmit include battery level, number of shifts, device ID, temperature, error codes, firmware version, etc.

ANT/BTLE Bridge

It is also possible for the present system 22 to communicate with other third party devices using standard protocols such as ANT or Bluetooth® Smart (BTLE). One of the devices in the system can collect data from the other devices such as battery level, gear position, firmware version, etc. and share the data with a third party device using a different communication protocol, effectively operating as an information bridge.

While this invention has been described by reference to particular embodiments, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A wireless control system for a bicycle, comprising:
a first control unit for a component of a bicycle, the first control unit comprising:
a radio configured to receive control signals, wirelessly transmitted by a second control unit of the bicycle, the radio operable to receive the control signal only when the radio is operating in a listen mode; and
a processor configured to:
activate the listen mode of the radio for a first length of time;
detect, with the radio, a noise level during the first length of time; and
extend the activation of the listen mode for a first extended time period when the noise level achieves a noise level threshold.

2. The wireless control system of claim 1, wherein the first extended time period is one of at least 250, 500, or 750 milliseconds.

3. The wireless control system of claim 1, wherein the processor is further configured to activate the listen mode of the radio for the first length of time periodically.

4. The wireless control system of claim 3, wherein the processor is further configured to deactivate the listen mode when the first length of time has lapsed if the detected noise level did not achieve the threshold during the first length of time.

5. The wireless control system of claim 1, wherein the processor is further configured to:
periodically detect, with the radio, the noise level during the first extended time period, and
deactivate the listen mode when the detected noise level does not achieve the noise level threshold during the first extended time period.

6. The wireless control system of claim 5, wherein the processor is further configured to:
detect, with the radio, the noise level during the first extended time period; and
extend the activation of the listen mode for a second extended time period when the noise level achieves the noise level threshold during the first extended time period.

7. The wireless control system of claim 1, wherein the noise level is detected as a measure of energy spectral density.

8. The wireless control system of claim 7, wherein the noise level threshold is established as a value of a range from approximately −70 dB to −40 dBm.

9. The wireless control system of claim 1, wherein the processor is further configured to detect the noise level only on a singular frequency channel.

10. The wireless control system of claim 1, wherein the control signals include a device identification associated with a transmitting device.

11. The wireless control system of claim 10, wherein the control signals associated with the transmitting device include a count value, wherein the count value sequentially increments with each successive control signal transmission from the same transmitting device.

12. The wireless control system of claim 11, wherein the processor is further configured to:
extend the activation of the listen mode for a second extended time period when the radio receives sequential control signals with the same device identification and non-sequential count values.

13. The wireless control system of claim 11, wherein the processor is further configured to:
adjust the value of the noise level threshold when the noise level threshold has not been achieved when the radio receives sequential control signals with the same device identification and non-sequential count values.

14. The wireless control system of claim 11, wherein the processor is further configured to:
adjust the value of the noise level threshold when the radio does not receive sequential control signals with the same device identification and non-sequential count values during the extended time.

15. A method for transmitting and receiving wireless control signals on a bicycle, wherein the method comprises:
transmitting wireless control signals to a radio;
listening, periodically, with the radio for a first length of time, for control signals transmitted by a control unit of a bicycle on a communication frequency channel;
determining, with a processor, a noise level on the frequency channel during the first length of time; and
listening with the radio for control signals for an extended length of time when the noise level achieves a noise level threshold.

16. The method according to claim 15, wherein the determination of the noise level is performed with the processor from values measured with the radio during the first length of time.

17. The method according to claim 15, wherein the wireless control signals comprise:
a shift command corresponding to an upshift, which is actuatable by an electromechanical gear changer; or
a shift command corresponding to a downshift, which is actuatable by the electromechanical gear changer.

18. The method of claim 15, wherein the processor and the radio are integral parts of a shift control unit for a bicycle.

19. The method of claim 15, further comprising:
detecting noise with a noise sensor in order to determine, with the processor, the noise level during the first length of time.

20. A bicycle control system, configured to accommodate a first control unit, the first control unit comprising:
a radio configured to receive a control signal wirelessly transmitted by a second control unit of the bicycle, the radio operable to receive the control signal only when the radio is operating in a listen mode, and
a processor configured to:
periodically activate the listen mode of the radio for a plurality of listen time periods;
periodically detect, with the radio, a noise level during the listen time periods;
deactivate the listen mode of the radio when the noise level has not achieved a noise level threshold during the listen time periods;
extend the activation of the listen mode for an extended time period when the radio detects that the noise level has achieved the noise level threshold during any listen time period of the plurality of listen time periods; and
deactivate the listen mode of the radio when the noise level has not achieved the noise level threshold during the extended time periods.

21. A wireless control system for a bicycle, comprising:
a first control unit for a component of a bicycle, the first control unit comprising:

at least one noise radio configured to detect a noise level of a wireless environment comprising signals wirelessly transmitted by a second control unit of the bicycle, and at least one receiving radio configured to receive control signals, wirelessly transmitted by the second control unit of the bicycle, the at least one receiving radio operable to receive the control signal only when the radio is operating in a listen mode; and a processor configured to activate the listen mode of the at least one receiving radio for a first length of time;

detect, with the at least one noise radio, the noise level; and extend the activation of the listen mode for a extended time period when the noise level achieves a noise level threshold.

* * * * *